(12) United States Patent
Warren et al.

(10) Patent No.: US 7,726,686 B2
(45) Date of Patent: Jun. 1, 2010

(54) GAS CONTAINMENT AND RELEASE DEVICE FOR AN INFLATOR

(75) Inventors: Donald E. Warren, Tipp City, OH (US); David A. Pray, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 211 days.

(21) Appl. No.: 11/866,398

(22) Filed: Oct. 2, 2007

(65) Prior Publication Data
US 2008/0246260 A1 Oct. 9, 2008

Related U.S. Application Data

(60) Provisional application No. 60/827,958, filed on Oct. 3, 2006.

(51) Int. Cl.
*B60R 21/26* (2006.01)

(52) U.S. Cl. ............... 280/737; 280/741; 102/531; 137/68.23

(58) Field of Classification Search ............... 280/737, 280/736, 741; 102/530, 531; 137/68.23
See application file for complete search history.

(56) References Cited

U.S. PATENT DOCUMENTS 5,947,143 A * 9/1999 Moakes et al. ............... 137/69
6,629,702 B2 * 10/2003 Specht et al. ............... 280/737

* cited by examiner

*Primary Examiner*—Ruth Ilan
*Assistant Examiner*—Keith Frisby
(74) *Attorney, Agent, or Firm*—Thomas N. Twomey

(57) ABSTRACT

A containment device for an inflator, the containment device comprising: an outlet plate having an outlet opening; a burst disk disposed over the outlet opening; an initiator having a support member; a movable support disposed between the support member and the burst disk, the support providing support to the burst disk; wherein activation of the initiator causes the movable support to move which allows the burst disk to rupture.

12 Claims, 4 Drawing Sheets

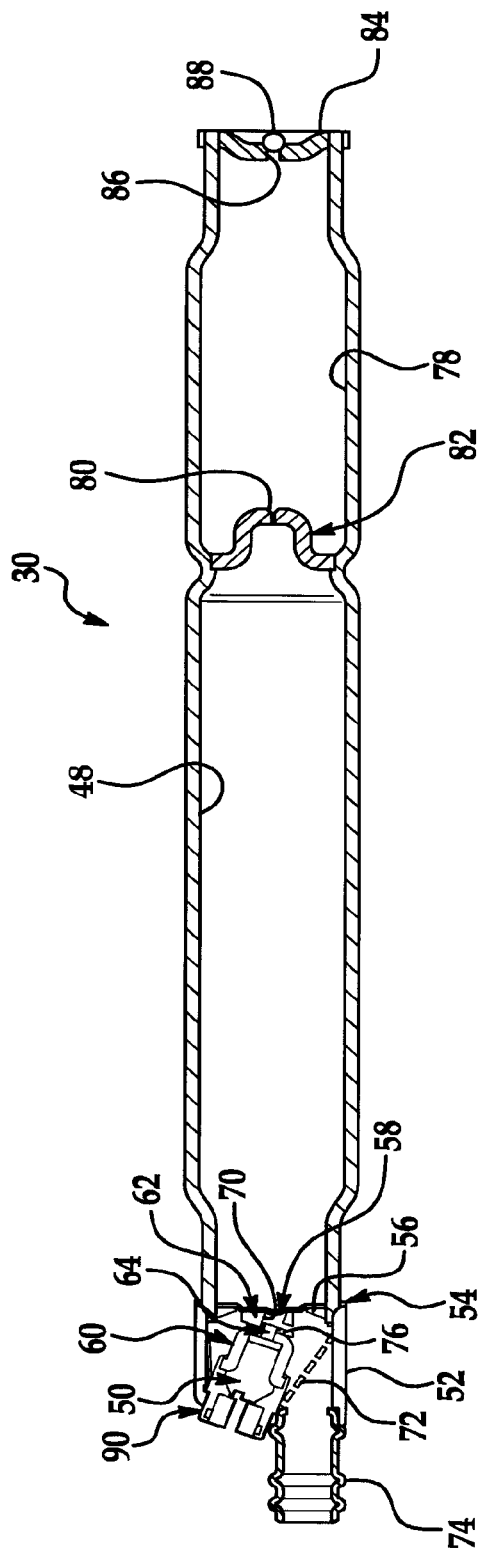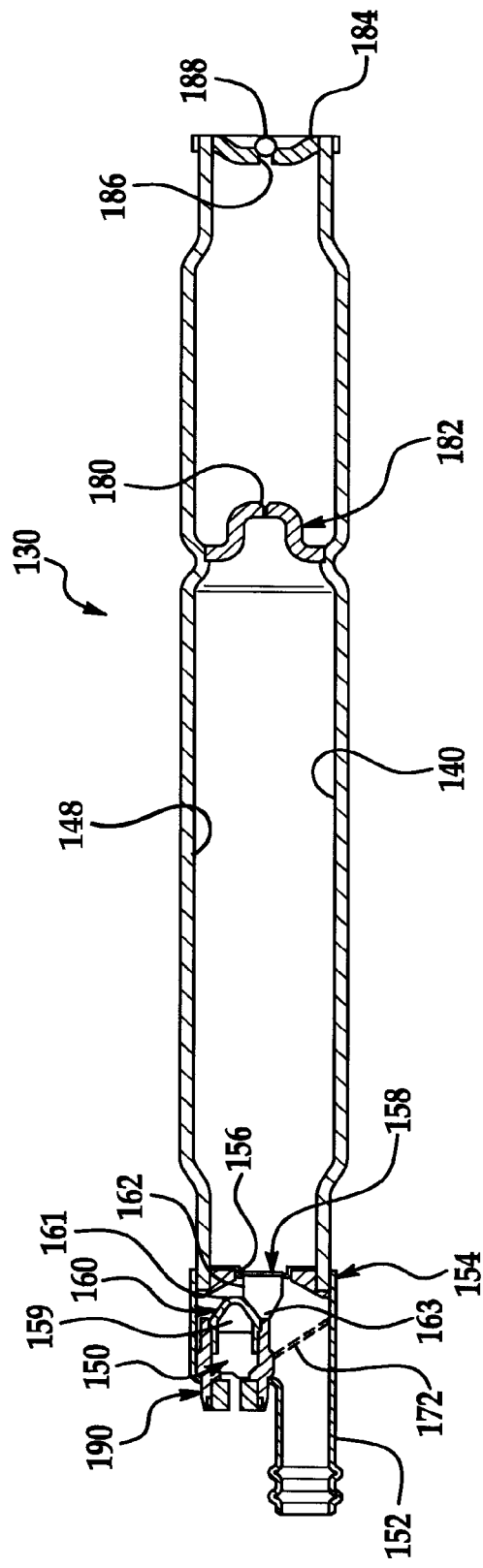

GAS CONTAINMENT AND RELEASE DEVICE FOR AN INFLATOR

CROSS REFERENCE TO RELATED APPLICATIONS

This application claims the benefit of U.S. Provisional Patent Application Ser. No. 60/827,958 filed Oct. 3, 2006, the contents of which are incorporated herein by reference thereto.

BACKGROUND

The present invention relates to airbag devices and more particularly the present invention relates to an apparatus and method for providing extended inflator output.

Today some vehicles are supplied with side airbag modules. A side airbag module comprises inflatable cushions or curtains that traverse a side portion of the vehicle when they are deployed in accordance with a predetermined activation event. Generally, the device is located along a side of the vehicle in an un-inflated state and upon activation deploys an inflatable curtain along a side portion of the vehicle. Side impact air bags or inflatable cushions are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

Substantial efforts have been directed to developing inflatable cushions or curtains having extended periods of inflation or in other words inflatable cushions that will retain their inflation gases for a period time after inflation. Some methods for providing this extended period of inflation is to minimize the inflation gas leakage by providing a one-piece-woven curtain airbag or by applying a sealant at the seams where the two sides of an inflatable cushion are sealed together. However, both of these methods are costly as they add additional manufacturing steps and methods.

Accordingly, it is desirable to provide an airbag module capable of providing an inflatable cushion or curtain with an extended period of inflation. In addition, it is also desirable to provide a containment apparatus for an inflator of the airbag module.

SUMMARY OF THE INVENTION

Exemplary embodiments of the present invention relate to a gas containment apparatus as well as apparatus and methods for providing variable discharge of inflation gases employed for inflating an inflatable cushion.

A containment device for an inflator, the containment device comprising: an outlet plate having an outlet opening; a burst disk disposed over the outlet opening; an initiator having a support member; a movable support disposed between the support member and the burst disk, the support providing support to the burst disk; wherein activation of the initiator causes the movable support to move which allows the burst disk to rupture.

An inflation device for inflating an inflatable cushion of an airbag module, the inflation device comprising: a first chamber and a second chamber, the first chamber having a first volume of inflation gas and the second chamber having a second volume of inflation gas; a first inflation opening for allowing the first volume of inflation gas to pass therethrough; a second inflation opening for allowing the second volume of inflation gas to pass into the second chamber; a containment device sealing the first inflation opening, the containment device comprising: an outlet plate having an outlet opening; a burst disk disposed over the outlet opening; an initiator having a support member; a movable support disposed between the support member and the burst disk, the support providing support to the burst disk; wherein activation of the initiator causes the movable support to move which allows the burst disk to rupture.

A method of rupturing a burst disk of an inflator, the method comprising: supporting the burst disk with a movable member disposed between the burst disk and a support member of an initiator, the movable member making contact with the burst disk and the support member; moving the movable member from a first position to a second position by activating the initiator wherein the movable member no longer supports the burst when it is at the second position.

BRIEF DESCRIPTION OF THE DRAWINGS

FIGS. 5-5A are schematic illustrations of containment device constructed in accordance with an alternative exemplary embodiment of the present invention.

DETAILED DESCRIPTION OF EXEMPLARY EMBODIMENTS

The disclosure of the present application relates to an air bag module. More particularly, exemplary embodiments of the present invention are directed to inflation devices, assemblies, and methods of inflating an inflatable device which may supply or furnish inflation gas in a manner that will provide or result in an extended stand-up time for an associated inflatable device. In addition, exemplary embodiments are directed to apparatus and methods to provide such inflation devices.

Exemplary embodiments of the present invention are directed to a device for the containment and release of pressurized gas from an airbag inflator. In one non-limiting exemplary embodiment, the inflator is filled with an inert gas to a pressure>6000 psi. Of course, exemplary embodiments of the present invention contemplate pressures less than or equal to 6000 psi.

In an exemplary embodiment, the gas is sealed in an inflator container with thin metal membrane or burst disk and external support is provided to the metal membrane to prevent inadvertent inflator discharge by preventing the pressurized gas from escaping the inflator container.

When used for side impact devices extended inflation time is desirable. Extended inflation time may be achieved by slowing releasing gas stored in a secondary chamber and using higher viscosity gases. A combination of these methodologies provides the desired performance from a single device. The release rate of the inflation gases must be controlled in addition, high viscosity gases typically require larger discharge openings than lower viscosity gases.

In accordance with an exemplary embodiment of the present invention, an external device is contemplated for supporting a burst disk or metal membrane covering a large inflation opening against a high viscosity gas stored behind the burst disk.

The external device will position a support member in front of the burst disk and upon activation of an initiator the support member will be released from its supporting position and the disk will be allowed to burst thereby releasing the stored gas. In addition, the burst disk must also meet additional constraints namely the metal membrane or burst disk must rupture at a minimum of 1.25 times service pressure of the inflator and at a maximum of 0.8 times the burst pressure of the gas container.

In addition, the gas must be contained over range of environmental exposures and as well as allow safe pressure relief at high temperatures.

This application also relates to methods and apparatus for providing extended inflator output in vehicle air bag systems. More particularly, exemplary embodiments are directed to an apparatus that is configured to provide an extended inflator output for use with an inflatable cushion.

Figure 1:
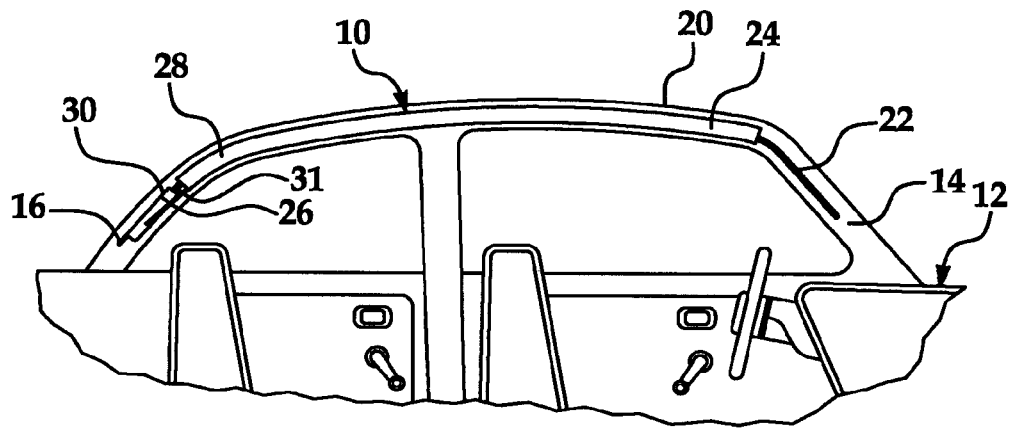
FIG. 1 is a side elevational view of an inflatable cushion in a stored position.

Referring now to FIG. 1, an inflatable cushion or air bag 10 is illustrated. Air bag 10 is manufactured and constructed in order to deploy in a variety of vehicle configurations. As discussed herein, exemplary embodiments of the present invention are related to apparatus and methods for providing extended inflator output for use with inflatable cushions. As used herein "inflatable cushions" is intended to refer to side curtain air bags, driver side air bags, passenger side air bags, etc. FIG. 1 provides a non-limiting example of an air bag or inflatable cushion 10 mounted to a vehicle 12 in a stored or non-deployed state. As illustrated, vehicle 12 comprises a front pillar 14, a rear pillar 16, and, if the vehicle is so equipped (e.g., it has more than one door per side), a center pillar or pillars 18. Such pillars are referred to by those skilled in the related arts as A, B, C and D pillars. Inflatable cushion 10 is stored and mounted on or proximate to a vehicle roof rail 20 beneath a headliner. In some applications a first tether or connecting means 22 connects a front portion 24 of the inflatable cushion to the front pillar and a second tether or connecting means 26 connects a rear portion 28 of the inflatable cushion to the rear pillar.

It is, of course, understood that depending on the application requirements or configuration of the air bag device, inflatable cushion 10 may not require connecting means 22 and 26. Thus, connecting means 22 and 26 are provided as examples and the present invention is not intended to be limited by the same.

As illustrated, the rear portion of the air bag is in fluid communication with a gas generator or inflator 30 positioned to provide an inflation gas to inflate inflatable cushion 10 via a diffuser tube 31 having a plurality of diffuser openings disclosed therein. It is, of course, understood and as applications may vary, the inflator may be positioned in other locations than those illustrated in the drawings. For example, the inflator may be located in a position farther forward in the vehicle such as the door pillar, the front pillar, or another location or locations. In addition, the diffuser tube may be configured to extend through a portion of the inflatable cushion, wherein a plurality of openings are positioned in the diffuser tube that traverses through an interior portion of the inflatable cushion. Thus, the presented location is provided as an example and the present invention is not intended to be limited by the same. In yet another alternative, the inflator may be remotely located and a conduit or other fluid providing means used to supply the inflating gas from the inflator to the inflatable cushion.

Figure 2:
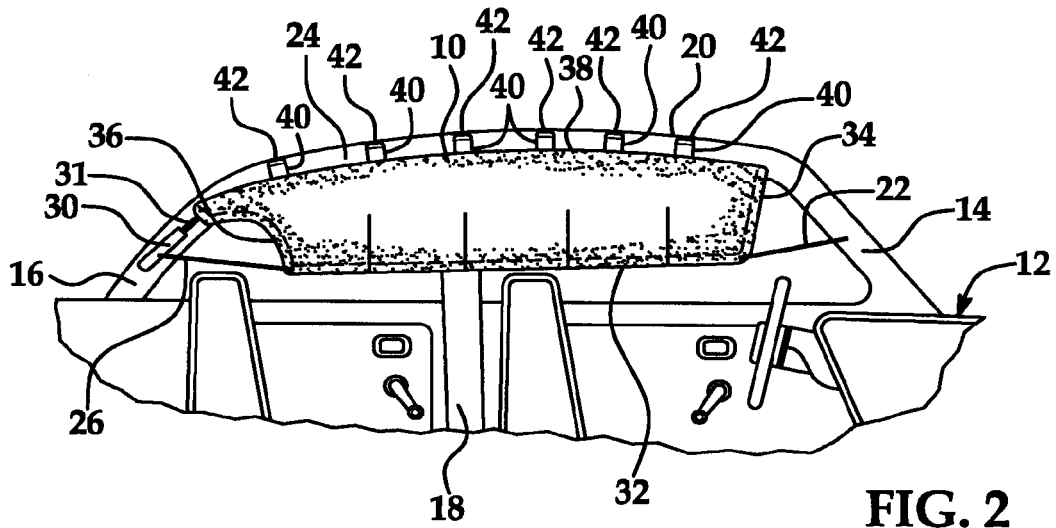
FIG. 2 is a side elevational view of an inflatable cushion in a deployed state.
Figure 3:
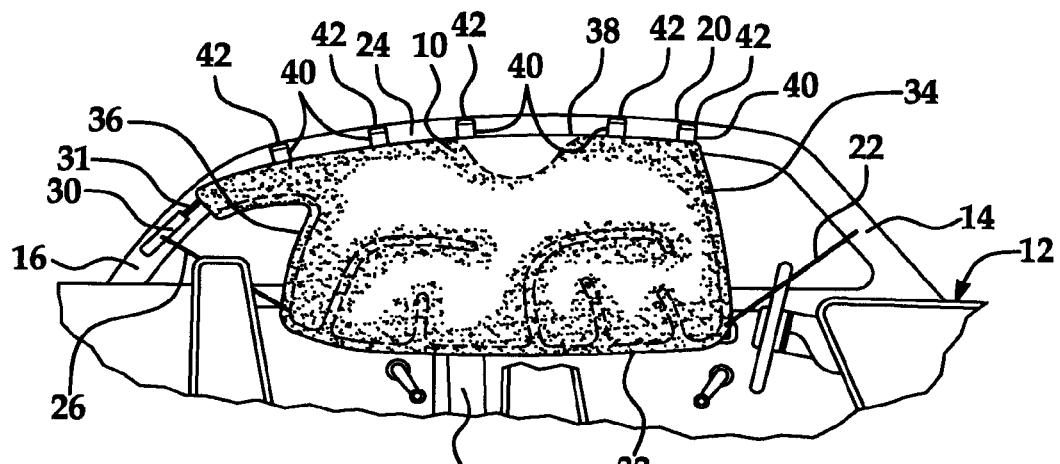
FIG. 3 is a side elevational view of another inflatable cushion in a deployed state.

FIGS. 2 and 3 illustrate inflatable cushion 10 of two different non-limiting designs in an inflated or deployed state. As illustrated in FIGS. 2 and 3, inflatable cushion 10 comprises a deploying edge 32, which comprises the bottom portion of the air bag that traverses across the window openings or window frames of the vehicle. Air bag 10 also comprises a forward edge 34, a rearward edge 36 and a fixed edge 38. Fixed edge 38 represents the portion of the air bag that remains in substantially the same position regardless of whether the air bag 10 is deployed or not.

Many different types of air bags or inflatable cushion arrangements (e.g., internal cavities, tethers or seams) are contemplated to be used with exemplary embodiments of the present invention. It is understood that the configuration of inflatable cushion 10 may vary and that the illustrations in FIGS. 1 and 2 are provided as examples. The present invention is not intended to be limited to the specific configurations provided in the figures, as they are considered ancillary to the present invention. Moreover, the present invention is contemplated for use with other vehicle configurations than those illustrated in FIGS. 1-3. For example, the vehicle may include three or more rows of seats. Such vehicles include but are not limited to sport utility vehicles, station wagons, vans or minivans. Conversely, the vehicle may comprise only a single row of seats, such vehicles including but not limited to sports coupes.

The inflatable cushion may be made of any air bag material suitable for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall air bag shape. Prior to deployment, the inflatable cushion is stored in a compartment mounted to the roof rail 24 or proximate to the roof rail as shown in FIG. 1. In order to store the air bag into the compartment, the un-inflated air bag is folded into a configuration which allows it to occupy a small discrete area within the vehicle interior.

In accordance with an exemplary embodiment the fixed edge 38 comprises a plurality of mounting portions 40, which comprise a portion of the inflatable cushion from which fixed edge 38 depends. As illustrated, mounting portions 40 are each secured to an attachment apparatus 42, which in accordance with an exemplary embodiment is configured to slidably engage a feature (e.g., mounting surface, mounting aperture) of the vehicle surface that is configured to engage the attachment apparatus 42. Alternatively, fixed edge 38 may be configured to have attachment apparatus 42 secured thereto negating the need for mounting portions 40. In accordance with an exemplary embodiment, each apparatus 42 is fixedly secured to the air bag via any suitable method, including rivets, bolts, studs, adhesives, etc. or equivalents thereof. In one exemplary embodiment, apparatus 42 is insert molded about a portion of the inflatable cushion.

Figure 4A:
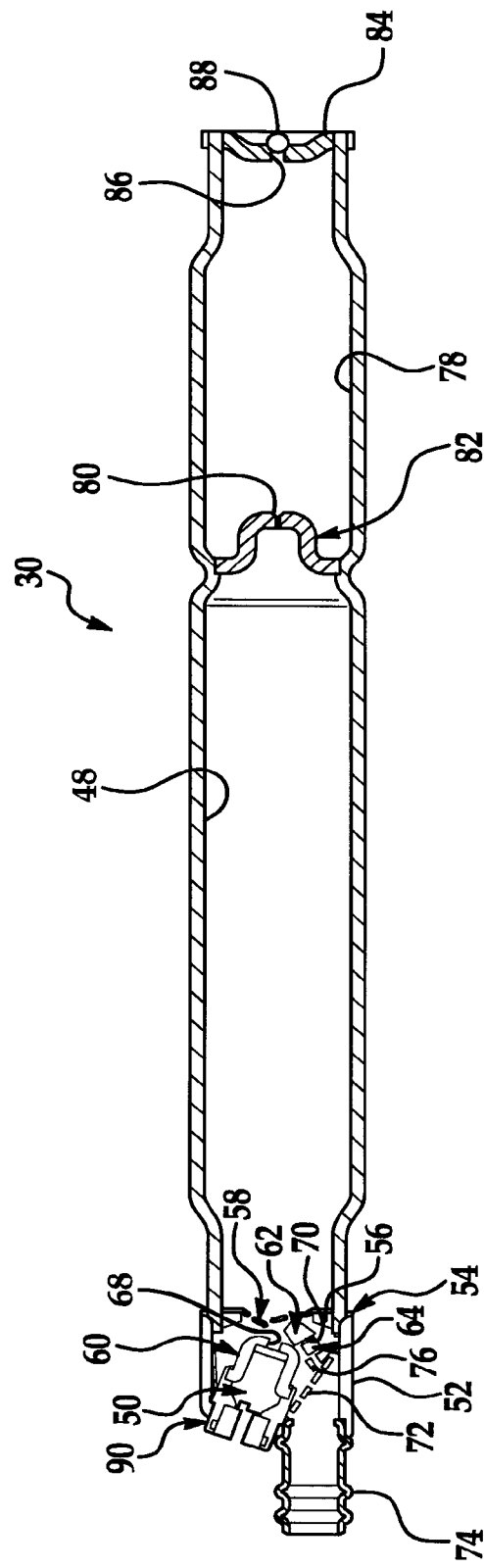
FIGS. 4-4B are schematic illustrations of containment device constructed in accordance with an exemplary embodiment of the present invention.

Referring now to FIG. 4, an exemplary embodiment of the present invention is illustrated. Here inflator 30 comprises a first inflation chamber 48 for storing a first volume of a compressed gas for inflation of the inflatable cushion during a predetermined activation event. As illustrated, first inflation chamber 48 further comprises initiator 50 positioned at one end of the first inflation chamber.

In accordance with an exemplary embodiment, initiator 50 is mounted to the first inflation chamber by an external support assembly or external containment device comprising a housing 52 that is secured to an end of the first inflation chamber. Housing 52 is also secured to an outlet plate 54, which is secured to the first inflation chamber. The outlet plate defines an outlet opening 56 that is sealed by a burst disk 58 comprising in one embodiment a thin metal membrane.

Disposed between burst disk 58 and initiator 50 is a support member 60 and a movable support or movable wedge member 62. Support member 60 surrounds a portion of the initiator. In accordance with an exemplary embodiment wedge member 62 is wedged between burst disk 58 and support member 60. In addition, a projectile or pin 64 is received in an opening 68 of the support member. In accordance with an exemplary embodiment the pin is also partially received within an opening 70 in the wedge member as well as the opening 68 of the support member in order to maintain the same in its supporting position between the burst disk and the support member. In accordance with an exemplary embodiment and when the initiator is activated the pin will stroke or travel away from the support member and through opening 70 in the wedge to release the wedge from its supporting position (See FIGS. 4A and 4B).

Figure 4B:
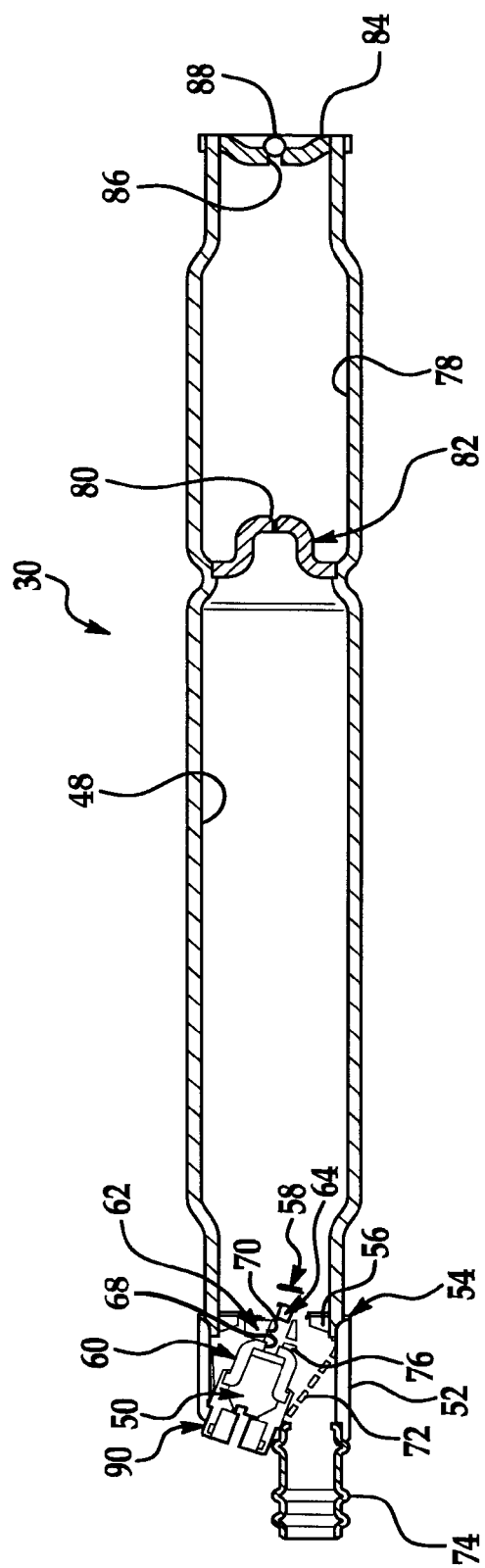

In addition, and in one embodiment projectile 64 will travel through opening 70 and make contact with the burst disk and rupture the same thereby releasing the gas of first inflation chamber 48 through outlet opening 56 (See FIG. 4B). Alternatively, pin 64 may be used solely for releasing the wedge and the movement of the wedge from its supporting position allows the disk to rupture (See FIG. 4A). In this embodiment, opening 70 may not extend all the way through the wedge or the opening is configured to limit the stroke of the pin therein (e.g., allows enough movement of the pin to allow the wedge to move away from the burst disk).

During this activation event wedge member 62 travels downwardly towards a screen member 72. In accordance with an exemplary embodiment screen member 72 is positioned to retain and/or prevent debris from exiting out of an outlet conduit 74 of the housing namely wedge member 62 and portions of the burst disk. In accordance with an exemplary embodiment, outlet conduit 74 is configured to provide fluid communication between the first inflation chamber and an inflatable cushion after the initiator has been activated and the burst disk has been removed from the outlet opening.

In accordance with an exemplary embodiment, the initiator is angularly configured such that a surface of the wedge support locates or supports the wedge between the wedge support and a portion of the burst disk when the initiator is in an un-activated state. Furthermore, this arrangement allows the wedge to support the burst disk as it retains the pressurized gas within the first inflation housing.

Wedge member 62 further comprises another opening 76, which is configured to allow inflation gases to pass therethrough, which as will be described below allows for the controlled release of the inflator gas under extreme temperatures and pressures. It is, of course, understood that the wedge member may have various configurations and exemplary embodiments of the present invention are not limited to the specific configurations of the wedge member illustrated herein.

In addition, inflator 30 further comprises a second inflation chamber 78. As illustrated, second inflation chamber 78 comprises a substantially smaller volume for holding a second amount of inflation gas, which is to be provided into the first inflation chamber and ultimately through the outlet opening via an output orifice 80 disposed in an orifice plate 82, which provides fluid communication between the first inflation chamber and the second inflation chamber.

Inflator 30 also has an end plate 84. End plate 84 is configured to have a fill passageway 86 and a sealing means 88 secured therein after a predetermined volume of inflation gas is supplied to the first and second inflation chambers. In accordance with an exemplary embodiment fill passageway 86 may be closed or plugged in any fashion that allows the first inflation chamber to be filled with a first compressed volume of inflation gas and sealed.

As is known in the related arts, initiator 50 is electrically coupled to a sensing and diagnostic module configured to receive and interpret signals from a plurality of sensors disposed within the vehicle in order to determine whether an activation signal is to be sent to initiator 50. Upon receipt of the activation signal initiator 50 will fire and pin 64 will stroke and burst disk 58 will rupture either from the pin 64 striking the burst disk or the wedge sliding away from a support position (FIG. 4) wherein the unsupported burst disk will rupture (e.g., some exemplary embodiments of the present invention contemplate a burst disk that will rupture without the support of a properly located wedge member). In addition, wedge member 62 will now be free to move thereby allowing the gas from chambers 40 and 78 to pass through outlet conduit 74.

A non-limiting example of a gas stored in inflation chambers 40 and 78 is argon, helium, carbon dioxide, nitrogen and equivalents and mixtures thereof.

In accordance with an exemplary embodiment, initiator 50 is received within an initiator retainer 90 that may comprise a portion of the housing. Initiator retainer 90 helps position initiator 50 such that upon activation of the same the pin will stroke and burst disk 58 will rupture.

As illustrated, opening 56 is substantially larger than opening 80 thus, the inflation output from second inflation chamber is at a substantially lower flow rate for an extended period of time, wherein the extended period of time is substantially longer than the period of time for the inflation gases to flow out of the first chamber. Accordingly and in accordance with an exemplary embodiment of the present invention, the first inflation chamber is used to provide an initial output for initially deploying and inflating the inflatable cushion, while the second inflation chamber is used to provide a secondary or supplemental inflation output during and after the initial inflation of the inflatable cushion. In accordance with an exemplary embodiment of the present invention, the output of the second inflation chamber is configured to counteract the leakage of the inflation gases from the inflatable cushion during initial deployment period. In other words, and in order to provide an extended period of inflation of the inflatable cushion, the first inflation chamber is used to provide an initial inflation output in order to deploy the inflatable cushion into a desired inflated configuration thereafter, any leakage of the inflation gases used to inflate the inflatable cushion are counteracted by the supplemental inflation output of the second inflation chamber as the smaller orifice of the second inflation chamber allows the supplemental inflation to be provided over a longer time period than those typically encountered for release of all the gases in a single stage inflator.

In accordance with an exemplary embodiment and as illustrated in FIG. 4, the external support assembly for the burst disk is positioned at an angle to inflator axis and the support member contacting the burst disk or metal membrane is wedge shaped, wherein the wedge shaped support member is fixed in position with a pin and activation of the initiator pressurizes a chamber behind the pin and the pin strokes and releases the wedge shaped support. Thereafter, the pressure load on the membrane creates a resultant force on the wedge shaped support pushing the support to the side and away from the membrane and the membrane ruptures allowing gas to exit while the support is captured by the screen.

In addition, and in accordance with an exemplary embodiment the containment device must also allow for controlled release of the inflator gases when the inflator is exposed to temperatures and/or pressures well above those of normal operating conditions (e.g., scenarios wherein activation of the initiator does not occur and the inflator is exposed to very high temperatures). In accordance with an exemplary embodiment the opening or hole in the support wedge member provides features to allow the bursting of the metal membrane and controlled release of gas at temperatures above storage environments. During this scenario the increasing gas temperature creates increased pressure within the inflator and the metal membrane deforms into the hole in the face of the wedge support and the membrane or burst disk ruptures into the support hole at a desired pressure and the gas is discharged at a low rate.

Accordingly, the rupture pressure is controlled by geometry of the support hole and properties of the metal membrane preventing gas release.

Figure 5A:
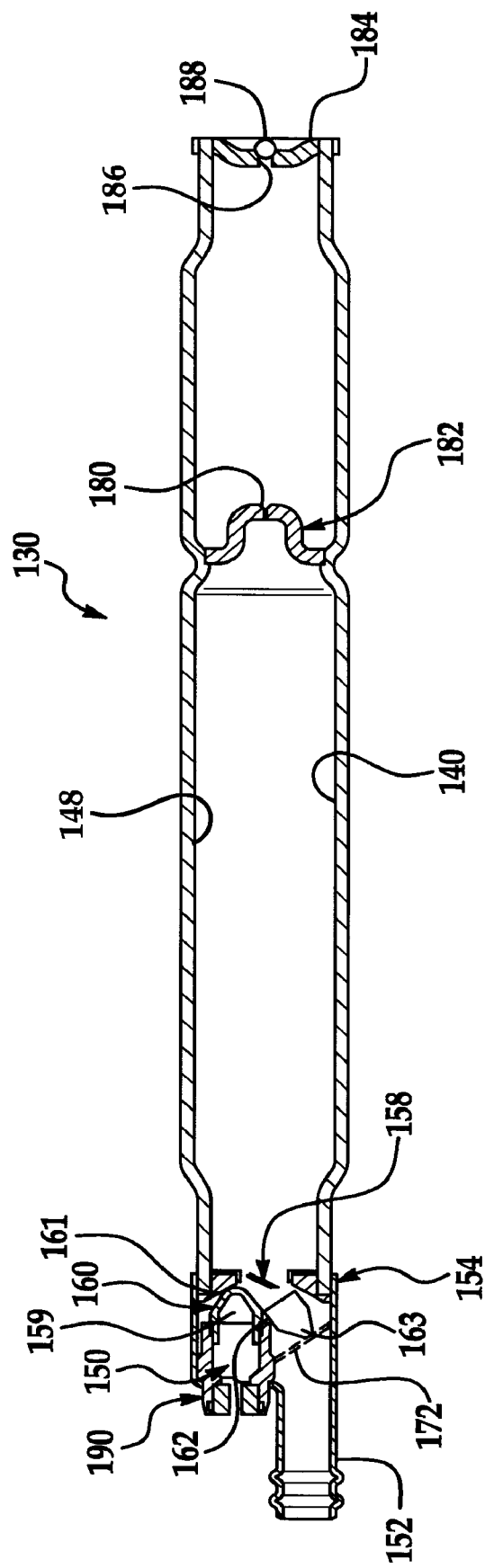

Referring now to FIGS. 5-5A, another alternative exemplary embodiment of the present invention is illustrated. Here component parts performing similar or analogous functions are labeled in multiples of 100.

In accordance with an exemplary embodiment and referring now to FIG. 5, the membrane or burst disk and membrane support are located on a center axis of the inflator wherein the support is attached directly to the metal membrane and the support also contacts the initiator retainer off-center on a parallel axis. In this embodiment, a cap 160 with a narrow tip is located over the initiator. During activation of the initiator a chamber behind the cap is pressurized and the cap strokes. The stroking cap contacts the support member and imparts axial and radial forces on the support member wherein the radial force component forces of the cap moves the support member and the membrane or burst disk is now unsupported and accordingly ruptures allowing the gas to exit (See FIG. 5A). Thereafter, the support is captured by the screen. In accordance with an exemplary embodiment, the support may be fixedly secured to the membrane or merely supported on the membrane by the cap. For example, if the support member 162 is fixedly secured to the burst disk movement of the support member will cause the burst disk to rupture. Alternatively, and if the support member is not fixedly secured to the burst disk, the cap 160 is configured to retain the support member in a position that provides support to the burst disk to prevent the same from rupturing due to the pressurized gases behind the burst disk and stroking of the cap 160 causes the support member 162 to no longer provide support to the burst disk and then the burs disk ruptures due to the pressure of the gas behind the burst disk. In other words and in this embodiment, the burst disk is configured such that the same will burst under a predetermined pressure unless the burst disk is supported by a support member and removal of the support member causes the burst disk to rupture.

Here inflator 130 comprises a first inflation chamber 148 for storing a first volume of a compressed gas for inflation of the inflatable cushion during a predetermined activation event. As illustrated, first inflation chamber 148 further comprises initiator 150 positioned at one end of the first inflation chamber. In accordance with an exemplary embodiment, initiator 150 is mounted to the first inflation chamber by an external support assembly comprising a housing 152 that is secured to an end of the first inflation chamber. Housing 152 is also secured to an outlet plate 154, which is secured to the first inflation chamber. The outlet plate defines an outlet opening 156 that is sealed by a burst disk or metal membrane 158.

Disposed between burst disk 158 and initiator 150 is a cap member 160 and a burst disk support member 162. Cap member 160 defines a chamber 159 in fluid communication with the initiator. In accordance with an exemplary embodiment burst disk support member 162 is located on the burst disk and the support member has an outer periphery or diameter that is less than the outer periphery or diameter of the burst disk. In addition, the burst disk support member is wedged between burst disk 158 and cap 160. In accordance with an exemplary embodiment cap 160 has a tip or feature 161 off axis to a tip or feature 163 of the burst disk support member.

In accordance with an exemplary embodiment, tip 161 is off axis but parallel to tip 163. Of course, other configurations (e.g., non-parallel) are contemplated. In accordance with an exemplary embodiment and when the initiator is activated the pressure in the chamber behind the cap increases and the cap will stroke away from the initiator causing the tip 161 to dislodge the support member via forces acting on tip 163. Thereafter, the burst disk will no longer be supported and the same will be allowed to rupture.

In accordance with an exemplary embodiment burst disk support member 162 comprises a chamfered surface defining tip 163 and a portion of the chamfered surface is configured to align with and support a complimentary chamfered surface of the burst disk support member comprising tip 161, wherein and upon activation of the initiator the burst disk support member 162 will travel away from the support member thereby releasing the gas of first inflation chamber 48 through outlet opening 56.

Inflator 130 also has an end plate 184. End plate 184 is configured to have a fill passageway 186 and a sealing means 188 secured therein after a predetermined volume of inflation gas is supplied to the first and second inflation chambers. In accordance with an exemplary embodiment fill passageway 86 may be closed or plugged in any fashion that allows the first inflation chamber to be filled with a first compressed volume of inflation gas and sealed.

As is known in the related arts, initiator 150 is electrically coupled to a sensing diagnostic module configured to receive and interpret signals from a plurality of sensors disposed within the vehicle in order to determine whether an activation signal is to be sent to initiator 150. Upon receipt of the activation signal initiator 150 will fire and allow burst disk 158 to rupture by moving the burst disk support member.

A non-limiting example of a gas stored in inflation chambers 40 and 78 is argon, helium, carbon dioxide, nitrogen and equivalents and mixtures thereof.

In accordance with an exemplary embodiment, initiator 150 is received within an initiator retainer 190 that may comprise a portion of the housing. Initiator retainer 190 helps position initiator 150 such that upon activation of the same the burst disk 158 will be allowed to rupture.

As illustrated, opening 56 or 156 is substantially larger than opening 80 or 180 thus, the inflation output from second inflation chamber is at a substantially lower flow rate for an extended period of time, wherein the extended period of time is substantially longer than the period of time for the inflation gases to flow out of the first chamber. Accordingly and in accordance with an exemplary embodiment of the present invention, the first inflation chamber is used to provide an initial output for initially deploying and inflating the inflatable cushion, while the second inflation chamber is used to provide a secondary or supplemental inflation output during and after the initial inflation of the inflatable cushion. In accordance with an exemplary embodiment of the present invention, the output of the second inflation chamber is configured to counteract the leakage of the inflation gases from the inflatable cushion during initial deployment period. In other words, and in order to provide an extended period of inflation of the inflatable cushion, the first inflation chamber is used to provide an initial inflation output in order to deploy the inflatable cushion into a desired inflated configuration thereafter, any leakage of the inflation gases used to inflate the inflatable cushion are counteracted by the supplemental inflation output of the second inflation chamber as the smaller orifice of the second inflation chamber allows the supplemental inflation to be provided over a longer time period than those typically encountered for release of all the gases in a single stage inflator.

In addition, and in accordance with an exemplary embodiment the containment device must also allow for controlled release of the inflator gases when the inflator is exposed to temperatures and/or pressures well above those of normal operating conditions (e.g., scenarios wherein activation of the initiator does not occur and the inflator is exposed to very high temperatures). In this embodiment, the support member prevents gas release under a standard range of storage environments however, an annulus between the support member and the outlet plate allows bursting of the metal membrane and controlled release of gas at temperatures above storage environments. For example, if the inflator is exposed to very high temperatures the increasing gas temperature creates increased pressure and the metal membrane deforms into the annulus between the support and outlet plate. Thereafter, the membrane ruptures into the annulus at a desired pressure and the contained gas is discharged at a controlled rate. Accordingly, the rupture pressure is controlled by geometry of the support and outlet plate and properties of the metal membrane. In accordance with an exemplary embodiment the support member provides features to allow the bursting of the metal membrane and controlled release of gas at temperatures above storage environments.

While the invention has been described above making specific reference to embodiments wherein the first chamber and the second chamber, are longitudinally aligned, the broader practice of the invention is not necessarily so limited.

It is also understood that the configuration of the inflatable cushions may vary and the illustrations of the cushion in the Figures are provided as examples and the present invention is not intended to be limited to the specific configurations provided in the figures, as they are considered ancillary to the present invention.

Moreover, the present invention is contemplated for use with numerous other vehicle configurations. For example, the vehicle may include three rows of seats; such vehicles include but are not limited to sports utility vehicles, station wagons, vans or minivans. Conversely, the vehicle may comprise only a single row of seats such vehicles include but are not limited to sports coupes. Therefore, the above-described airbag module may be easily modified to accommodate all types of vehicles in several different types of configurations.

Furthermore, prior to deployment, the inflatable cushion may be stored in a compartment mounted to the roof rail or proximate to the roof rail. In order to store the airbag into the compartment the un-inflated inflatable cushions are folded into configurations, which allow it to occupy small discrete areas within the vehicle interior.

When a predetermined activation event or occurrence is detected, the inflatable cushion is inflated by gas from the inflator. In general, the inflator will receive an inflation or deployment signal that causes the inflator to generate an inflation gas or inflation output for inflating the inflatable cushion. In the exemplary embodiments described above, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An external containment device for an inflator, the containment device comprising:
    an outlet plate having an outlet opening;
    a burst disk disposed over the outlet opening;
    an initiator having a support member;
    a movable support comprising a wedge having an opening therethrough and a projectile releasably secured to the support member, a portion of the projectile being received in the opening in the wedge to position and secure the wedge between the support member and the burst disk, the wedge being disposed between the support member and the burst disk, the movable support providing support to the burst disk;
    wherein activation of the initiator causes the projectile to travel through the opening thereby allowing the wedge to be displaced and the burst disk to rupture.

2. The containment device as in claim 1, wherein the wedge further comprises a vent opening.

3. The containment device as in claim 1, wherein the projectile strikes the burst disk after activation of the initiator.

4. The containment device as in claim 1, wherein the wedge is capable of movement from a first position to a second position after activation of the initiator and the wedge no longer provides support to the burst disk when the wedge is in the second position.

5. The containment device as in claim 1, wherein the outlet plate, the burst disk, the initiator, the support member and the wedge are received within a housing having an outlet opening.

6. The containment device as in claim 5, wherein the housing has a screen member disposed between the outlet opening and the wedge.

7. An inflation device for inflating an inflatable cushion of an airbag module, the inflation device comprising:
    a first chamber and a second chamber, the first chamber having a first volume of inflation gas and the second chamber having a second volume of inflation gas;
    a first inflation opening for allowing the first volume of inflation gas to pass therethrough;
    a second inflation opening for allowing the second volume of inflation gas to pass into the second chamber;
    an external containment device sealing the first inflation opening, the containment device comprising:
    an outlet plate having an outlet opening;
    a burst disk disposed over the outlet opening;
    an initiator having a support member;

a movable support comprising a wedge having an opening therethrough and a projectile releasably secured to the support member, a portion of the projectile being received in the opening in the wedge to position and secure the wedge between the support member and the burst disk, the wedge being disposed between the support member and the burst disk, the support providing support to the burst disk;

wherein activation of the initiator causes the projectile to travel through the opening thereby allowing the wedge to be displaced and the burst disk to rupture.

8. The inflation device as in claim 7, wherein the wedge further comprises a vent opening.

9. The inflation device as in claim 7, wherein the projectile strikes the burst disk after activation of the initiator.

10. The inflation device as in claim 7, wherein the wedge is capable of movement from a first position to a second position after activation of the initiator and the wedge no longer provides support to the burst disk when the wedge is in the second position.

11. The inflation device as in claim 7, wherein the outlet plate, the burst disk, the initiator, the support member and the wedge are received within a housing having an outlet opening and wherein the housing has a screen member disposed between the outlet opening and the wedge.

12. The inflation device as in claim 7, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

* * * * *